United States Patent [19]

Soder et al.

[11] Patent Number: 4,906,050
[45] Date of Patent: Mar. 6, 1990

[54] BEADS FOR BICYCLE WHEEL SPOKES

[76] Inventors: Thomas S. Soder, P.O. Box 2312, Walnut Creek, Calif. 94595; Larry V. Harmen, 29839 Clearbrook Cir. #56, Hayward, Calif. 94544

[21] Appl. No.: 778,819
[22] Filed: Sep. 23, 1985
[51] Int. Cl.⁴ .............................................. B60B 7/00
[52] U.S. Cl. .............................. 301/37 SA; 301/37 R
[58] Field of Search .................. 301/5 B, 37 R, 37 P, 301/37 SA, 37 H, 37 L; 362/72, 78

[56] References Cited

U.S. PATENT DOCUMENTS

| | | | |
|---|---|---|---|
| 1,712,408 | 5/1929 | Strandlund | 301/5 B |
| 2,269,670 | 1/1942 | Kieckbusch | 301/5 B |
| 2,558,423 | 6/1951 | Dobrosky | 301/37 SA |
| 2,621,081 | 12/1952 | Mann | 301/37 P |
| 3,579,408 | 5/1971 | Dowhan | 301/37 R |
| 3,612,612 | 10/1971 | Gannon | 301/37 SA |
| 4,293,189 | 10/1981 | Morikawa | 301/37 SA X |

Primary Examiner—Russell D. Stormer
Attorney, Agent, or Firm—Lawrence I. Field

[57] ABSTRACT

Beads which can be snapped onto bicycle wheel spokes and which are free to slide along the spokes. The beads are colored and create pleasing visible and audible effects when the wheel turns.

1 Claim, 1 Drawing Sheet

BEADS FOR BICYCLE WHEEL SPOKES

This invention relates to beads which when attached to the spokes of a bicycle wheel create pleasing visible and audible effects when the bicycle wheel is turning.

Ornamental attachments to bicycle wheels are enjoyed by children and are described in the following United States Patents of which we are aware:

| INVENTOR | U.S. Pat. No. | ISSUED |
|---|---|---|
| Dobrosky | 2,558,423 | June 26, 1951 |
| Mann | 2,621,081 | December 9, 1952 |
| Lange | 3,007,743 | November 7, 1961 |
| Hamilton | 3,082,041 | March 19, 1963 |
| Dowhan | 3,579,408 | May 18, 1971 |
| Gannon | 3,612,612 | October 12, 1971 |

The ornaments shown in those patents when attached to the spokes or the rim of a bicycle wheel remain fixed relative to the spoke once they have been installed and secured.

The ornament of the present invention is a small bead which is free to slide along the length of the spoke after it has been installed and hence is capable of creating a visual effect not attainable with the prior art ornaments listed above. In addition, because the beads can move along the spoke they can produce an audible noise when they reach the end of their travel or if they strike one another in moving along their respective spokes.

A principal object of this invention is to provide an ornament for the spokes of a bicycle which produces novel and pleasure giving visual and audible effects after it has been attached to the spoke of a bicycle.

Another object is to provide an ornament which is easy to install so that it may be attached by children without the necessity of any tools.

A further object is to provide a colored bead for attachment to the spokes of a bicycle which is readily removed from the spoke so that the color scheme of a sequence of beads can be changed at the pleasure of the user.

These and other objects will be pointed out or will become apparent from the description which follows taken in conjunction with the drawings in which.

Figure 1:
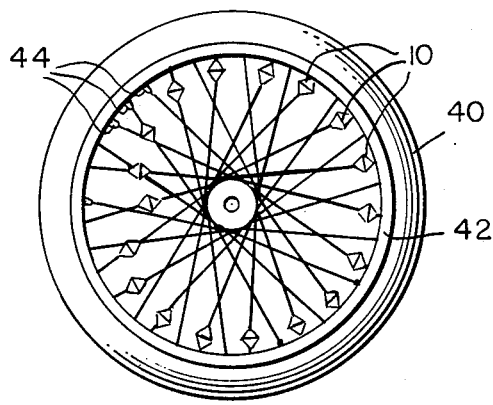
FIG. 1 is a view in elevation of a standard bicycle wheel with the ornamental beads of the invention attached thereto.
Figure 2:
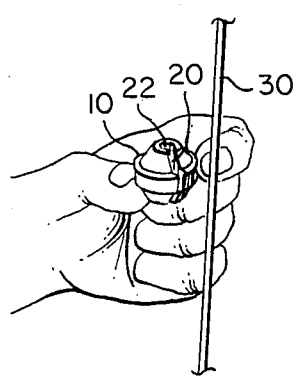
FIG. 2 is a schematic view showing the manner in which a bead is placed on a spoke.
Figure 3:
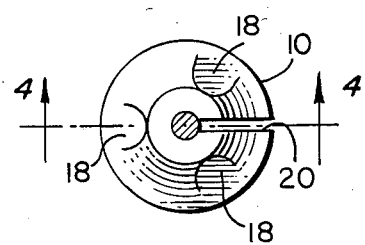
FIG. 3 is a top plan view of the bead after it has been installed on a spoke.
Figure 4:
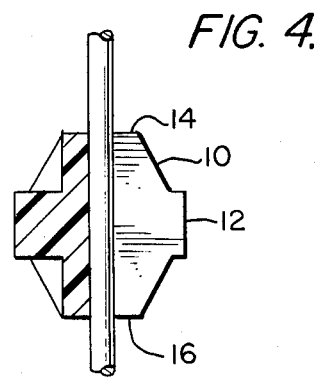
FIG. 4 is a view partly in section taken on plane 4-4 of FIG. 3.

As best seen in FIGS. 2, 3 and 4, the bead 10 of this invention is a small barrel shaped molded plastic member having a band 12 which encircles the bead midway between an upper extremity 14 and a lower extremity 16. The bead shown is frusto-conical in shape on either side of band 12 and has indentations 18 which reduce its weight, three such indentations being shown in FIG. 3.

Bead 10 is also provided with a slot 20 which extends from a bore 22 which extends from upper extremity 14 through lower extremity 16, centrally of the bead, outwardly through one plane of the bead.

Because of the natural resilience of the material of which the bead is fabricated (low density polyethylene), the slot 20 of the bead is opened by the spoke when the bead is pushed onto spoke 30. Bore 22 is of such a size that bead 10 can slide freely along spoke 30 and the rsilience of the material is such that the bead does not fall off the spoke.

When the wheel is at rest the individual beads slide to their lowermost position on their individual spokes. As the wheel is rotated, the beads tends to fly toward the rim 42 of wheel 40 and eventually strike the nipple 44 through which spoke 30 is attached to wheel 40, making an audible clicking sound as it does so.

Should the wheel hit a bump the beads slide back toward the center of the bicycle wheel and if two beads pass close enough to one another to make contact, they make an audible "clicking" noise.

The shape of the bead is not limited to that shown in the drawings. The bead could be spherical or ellipsoidal (like a football), it merely being necessary that it possess an axial bore 30 and a slot 20, and that the slot extend to the bore, a condition readily fulfilled when the slot and the bore lie in the same plane.

The beads are colored various colors and may be attached in a sequence which produces a special effect, e.g., a rainbow, or red/white/blue or whatever strikes the fancy of the user. The beads are also readily detached so that the color scheme may be altered as desired.

Having now described the invention, it is not intended that it be limited except as it is defined in the appended claims.

We claim:

1. A set of beads for slideable attachment to the spokes of a bicycle wheel, said beads being of a variety of colors, each said bead comprising a generally ball shaped member having a central bore extending axially of said bead and a slot in said bead extending from the surface of the bead to the bore, said bore and said slot lying in a common plane, the diameter of said bore being of such a size that each bead can slide freely along the spoke, each of said beads making an audible clicking sound when it reaches either end of the spoke and when it makes contact with a bead on an adjacent spoke.

* * * * *